US005837985A

United States Patent [19]
Karpen

[11] Patent Number: 5,837,985
[45] Date of Patent: Nov. 17, 1998

[54] OPTICAL IMAGING ASSEMBLY HAVING IMPROVED IMAGE SENSOR ORIENTATION

[75] Inventor: Thomas W. Karpen, Skaneateles, N.Y.

[73] Assignee: Welch Allyn, Inc., Skaneateles Falls, N.Y.

[21] Appl. No.: 692,807

[22] Filed: Jul. 31, 1996

Related U.S. Application Data

[63] Continuation of Ser. No. 649,126, May 14, 1994.

[51] Int. Cl.⁶ ........................................................ G06K 7/10
[52] U.S. Cl. ............................................ 235/462; 235/472
[58] Field of Search .................................... 235/462, 472, 235/454

[56] References Cited

U.S. PATENT DOCUMENTS

| | | | |
|---|---|---|---|
| 4,488,679 | 12/1984 | Bockholt et al. | 235/469 |
| 4,570,057 | 2/1986 | Chadima, Jr. | 235/472 |
| 5,331,176 | 7/1994 | Sant'Anselmo | 250/566 |
| 5,378,883 | 1/1995 | Batterman | 235/472 |
| 5,477,044 | 12/1995 | Aragon | 235/472 |
| 5,521,366 | 5/1996 | Wang | 235/454 |
| 5,525,787 | 6/1996 | Kubo | 235/462 |

FOREIGN PATENT DOCUMENTS

WO 9215036  9/1992  WIPO.

Primary Examiner—Donald T. Hajec
Assistant Examiner—Karl Frech
Attorney, Agent, or Firm—Wall Marjama Bilinski & Burr

[57] ABSTRACT

An imaging assembly having a 2D image sensor so oriented in relation to its supporting structure that, when a reader including the imaging assembly is held in its normal operating position during the reading of a 1D bar code symbol, the image of that 1D symbol is aligned with a diagonal of the image sensor, thereby increasing the resolution with which the 1D symbol is read. An image sensor including a generally rectangular 2D array of photosensitive elements is secured to a mounting structure so that the plane of the array is generally parallel to and approximately in the focal plane of an associated 2D imaging optics assembly. The angular orientation of the image sensor with respect to its mounting structure is selected so that, when a reader including the imaging assembly is held in its normal reading position during the reading of a 1D symbol, the image of the 1D symbol is formed along a diagonal of the array.

30 Claims, 8 Drawing Sheets

OPTICAL IMAGING ASSEMBLY HAVING IMPROVED IMAGE SENSOR ORIENTATION

CROSS REFERENCES TO RELATED APPLICATIONS

This is a continuation-in-part of U.S. patent application Ser. No. 08/649,126, entitled "Improved Imaging and Illumination Optics Assembly", filed May 14, 1996.

BACKGROUND OF THE INVENTION

This invention relates to an optical imaging unit suitable for use in two-dimensional bar code readers, and is directed more particularly to an optical imaging unit having a two-dimensional image sensor that has a new orientation with respect to the direction in which one-dimensional image sensors have been oriented in the past.

Bar code readers have, until recently, been designed to scan linearly in one dimension only. As disclosed in U.S. Pat. Nos. 5,378,883 to Batterman and 5,331,786 to Sant Anselmo et al. "omnidirectional" readers have been developed that utilize solid state image sensors or imagers that are able to scan rapidly in two dimensions. These 2D readers also have the ability of reading multiple targets during the course of one scanning pass to increase the data throughput rate thereof.

Although the recently developed 2D readers have many advantages over their 1D counterparts, they require additional electrical and lighting components, and thus occupy more space. Space in a hand-held reader is rather limited and any reduction in the size and weight of the optical imaging assembly unit adds greatly to the ease of operation of the reader and a corresponding reduction in operator fatigue. In addition, a small, light weight reader can be more easily and accurately placed upon a target thereby minimizing the amount of time the reader must be on, which is an important consideration with regard to battery operated units.

2D bar code readers are usually equipped with light emitting diodes (LEDs) for illuminating a target. The LEDs are arranged upon a board about the lens system which focuses an image of the illuminated target upon the 2D imager. The distal ends of the LEDs, however, extend some distance beyond the front lens of the lens system. In addition, these readers are equipped with light polarizing filters which are mounted in front of the LEDs. As a consequence, a good deal of space forward of the lens system is required to accommodate the LEDs and polarizing filters. Placing the LEDs forward of the lens system can also have an adverse effect on image quality, particularly when the target is mounted upon a highly reflective surface. Direct light from the LEDs can, under certain conditions, combine with the light coming back to the imager from the highly reflective surface to over-expose the imager.

When a 2D bar code reader is used to read 2D bar code symbols, the array of photosensitive elements of the imager thereof is used with a high degree of efficiency. This is because such photosensitive arrays are roughly square, e.g. 768×574 pixels, and because 2D bar code symbols are also either actually or roughly square. In addition, because 2D bar code readers require less resolution than 1D bar code readers, mismatches between the sizes of the arrays and the sizes and orientations of the images formed thereon are less important in the case of 2D bar code symbols than in the case of 1D bar code symbols. This, coupled with the fact that 2D bar code readers are designed to read 2D bar code symbols without regard to their orientation, makes the orientation of the imager, with respect to its housing unimportant.

When a 2D bar code reader is used to read 1D bar code symbols, however, the array of photosensitive elements of the imager thereof is used less efficiently. This is because such photosensitive arrays are roughly square, while 1D bar code symbols are often relatively elongated along the normal or optimum reading direction thereof. In addition, because 1D bar code symbols require higher resolution in their normal reading direction than 2D bar code symbols, mismatches between the sizes of the arrays and the sizes and orientation of the images formed thereon are highly important. This has often resulted in many 1D bar code symbols, especially relatively elongated 1D bar code symbols, being unreadable by 2D bar code readers.

SUMMARY OF THE INVENTION

In accordance with the present invention there is provided an improved optical imaging assembly which increases the probability that 2D bar code readers will be able to read 1D bar code symbols.

The present invention is based on the recognition that a 1D bar code symbol has the highest probability of being read by a 2D imager, if the image formed on the photosensitive array of the image sensor is present on as many pixels of the image sensor as possible. Stated differently, the present invention is based on the recognition that a 1D bar code symbol has the highest possibility of being decoded if the longest dimension of the image of that symbol is imaged by as many pixels as possible.

In accordance with the present invention, the formation of the largest possible image of a 1D symbol is achieved by orienting the imager so that, when the reader has its optimum orientation for reading a 1D symbol, the long dimension of the 1D symbol falls along a diagonal of the photosensitive array of the imager. In the case of an imager with a square photosensitive array, this is achieved by orienting the imager at an angle that is rotated through 45° with respect to the usual rectilinear orientation thereof. In the case of an imager with a rectangular (e.g. 768×574 pixel) array, this is achieved by orienting the image at an angle that is rotated through 36.7° with respect to the usual rectilinear orientation thereof. Significantly, since 2D bar code readers are specifically designed to operate without regard to the orientation of 2D matrix symbols, this improvement in 1D readability is achieved without a diminution of the ability of the reader to read and decode 2D matrix bar code symbols.

In the preferred embodiment, the advantages of using a diagonally oriented imager are realized as a part of an improved low profile optical illumination assembly, having a reduced size, that is easily mountable in the front portion of the housing of a hand-held bar code reader. This low profile optical imaging assembly preferably includes a plurality of illuminating LEDs and a light redirecting panel for concentrating light emitted by the LEDs in the direction of the target symbol that is some distance away from the 2D imager.

The above-mentioned illumination features of the present invention are attained by using a low profile optical assembly which, in one embodiment, includes a light redirecting panel having a series of contoured openings passing therethrough. An LED board is mounted immediately behind the panel and contains a plurality of flat topped light emitting diodes (LEDs) that are positioned behind the contoured openings in the panel. The surfaces of the opening are reflective and are arranged to redirect the illumination from the LEDs into the target region. An imager housing is secured to the back of the LED board and has a recessed chamber that opens to the back of the housing. An integral hollow lens barrel extends forward of the chamber and passes through holes provided in the LED board and the light redirecting panel. An imager board is secured to the back of the housing and has a solid state 2D imager mounted on its front face that is contained within the recessed chamber of the housing. A lens holder is adjustably mounted within the lens barrel which focusses a target image upon the imager. The back focal length of the lens system is minimized along with the spacing between the light redirecting panel and the LED board to minimize the amount of space required by the unit. An aiming or spotting light is mounted over the lens barrel in a recessed seat formed in the light redirecting panel and the LED board to further minimize the amount of space consumed by the unit.

BRIEF DESCRIPTION OF THE DRAWINGS

For a better understanding of these and other objects of the present invention reference will be made to the following detailed description of the invention which is to be read in conjunction with the associated drawings, wherein.

DESCRIPTION OF THE INVENTION

Figure 1:
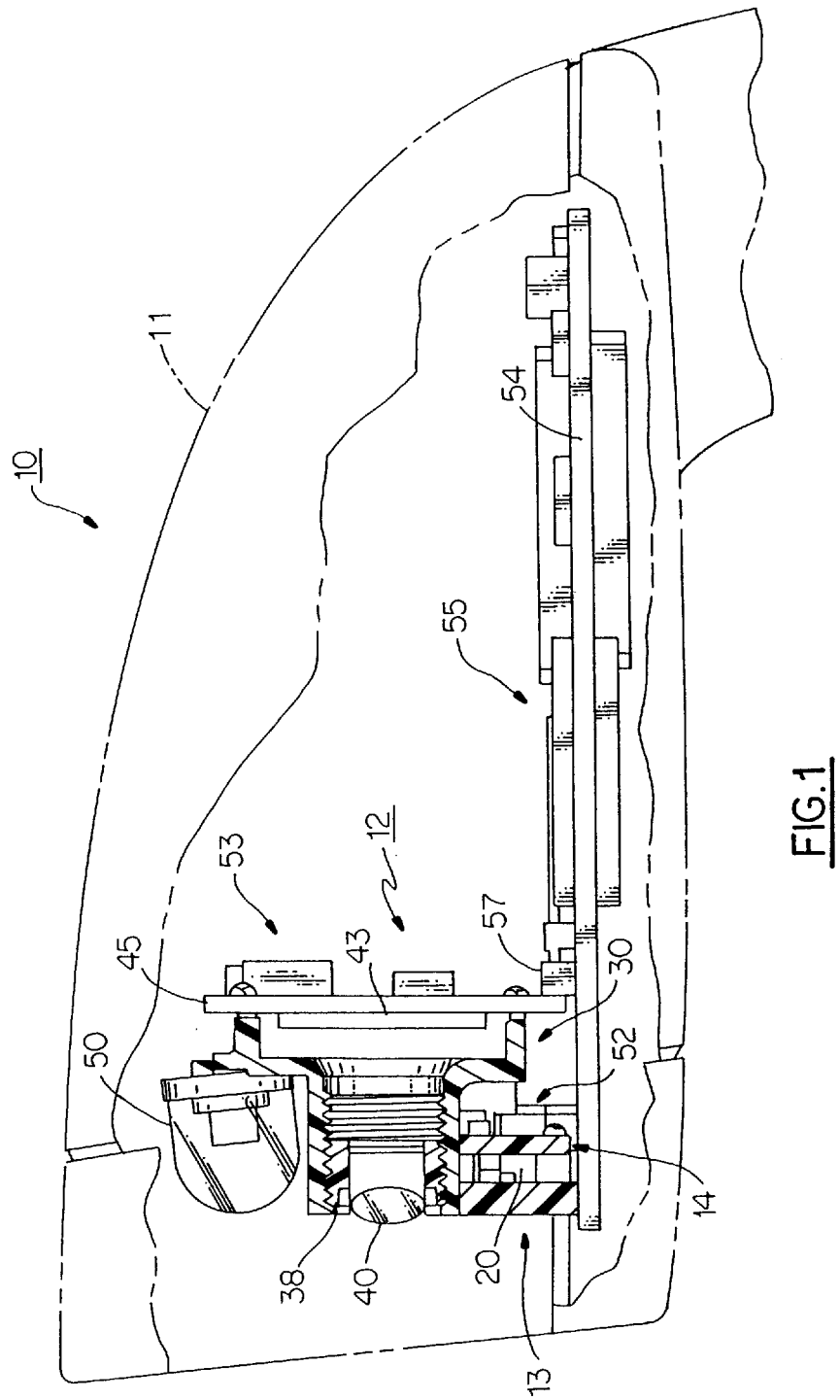
FIG. 1 is a side elevation of a hand-held bar code reader containing a low profile optical assembly embodying the teachings of the present invention.
Figure 2:
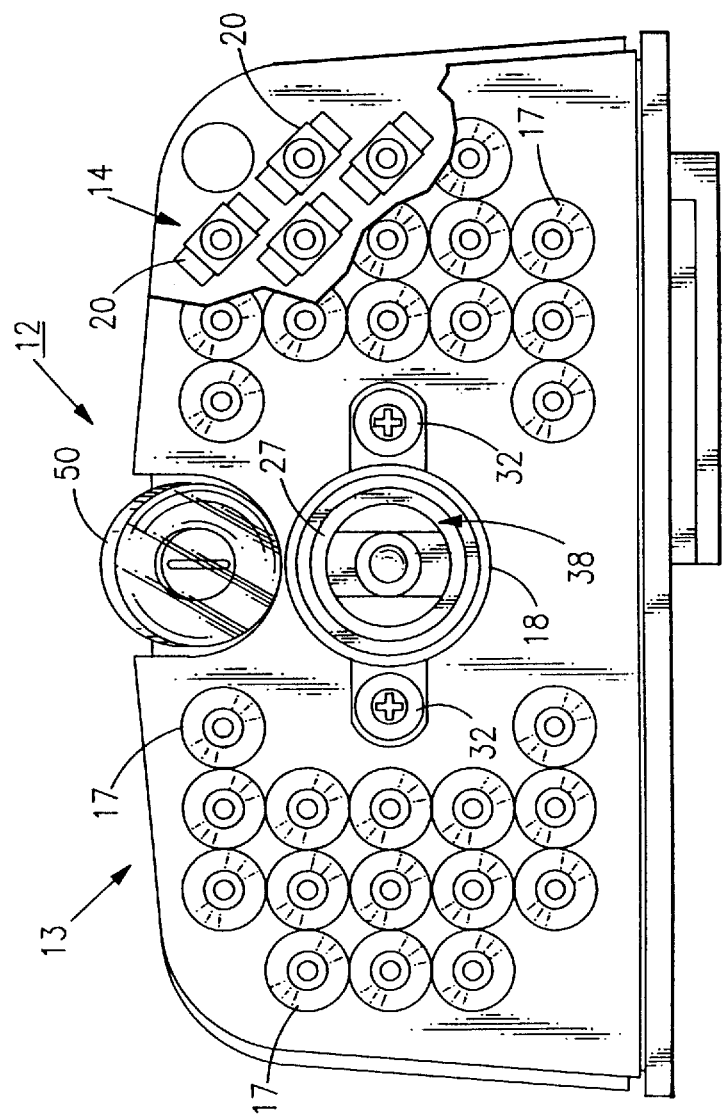
FIG. 2 is an enlarged front view of the optical assembly illustrated in FIG. 1 further showing the light redirecting panel and the light emitting diode arrangement utilized therein.
Figure 3:
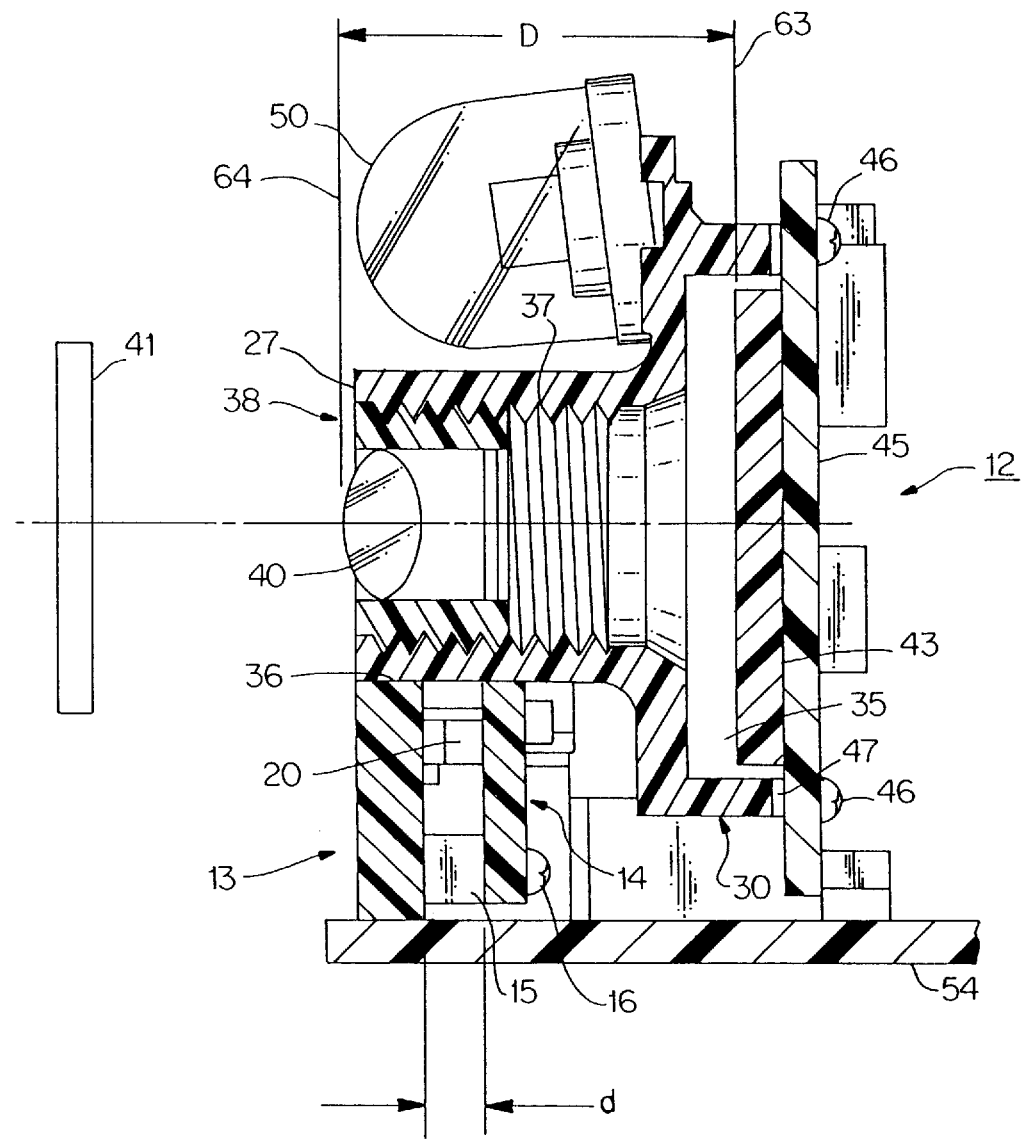
FIG. 3 is an enlarged side elevation in section of the present optical assembly with some of the electrical components removed for clarity showing in greater detail the structural and optical elements of the assembly.

Referring initially to FIGS. 1–3, there is shown a hand-held bar code reader generally referenced 10 that embodies the teachings of the present invention. The reader includes an outer housing 11 shown in phantom outline which contains the component parts of a low profile optical assembly or unit generally depicted at 12. These parts include a front light redirecting panel 13 and a LED board 14 that is positioned immediately behind the panel in close parallel alignment therewith. These parts also include a 2D image sensor 43 supported on an imager board 45.

The Illumination Assembly

As best seen in FIG. 3, the LED board is mounted upon spacer legs 15 that are integral with the front panel by any suitable type of fasteners such as screws 16 or the like. As will be explained in greater detail below, the spacing (d) between the rear face of the light redirecting panel and the front face of the LED board is minimized to, along with other features of the invention, compact the component parts of the reader into a space saving unit well suited for use in a hand-held reader.

The term "front" used herein in reference to various components contained within the optical unit refers to that side of a part or component of the unit that faces a bar code target as it is being read. Correspondingly, the terms "back" or "rear" as herein used shall refer to that side of a part or component that faces away from the target.

As illustrated in FIG. 2, the light redirecting panel 13 contains a plurality of specially contoured openings 17—17 that are strategically arranged about a central opening 18 provided in the panel. The contoured openings in the panel pass completely through the panel between its front and rear faces. Situated immediately behind each of the contoured opening is a light emitting diode 20 which is mounted on the front face of the LED board.

The light emitting diodes (LEDs) are selected from a family of low profile flat top commercially available devices that are manufactured by a number of suppliers, such as Siemens and Hewlett Packard. The flat top diodes are surface mounted devices equipped with flat epoxy light exit windows rather than lenses. Accordingly, the LEDs mounted on the LED board immediately behind the contoured openings in the light redirecting panel utilize a minimum amount of space and permits the board and the panel to be brought into close parallel alignment in assembly. Although flat top light emitting diodes are used in this embodiment of the invention, other low profile light emitting diodes such as those known as chips on a board can be used without departing from the teachings of the present invention.

Figure 4:
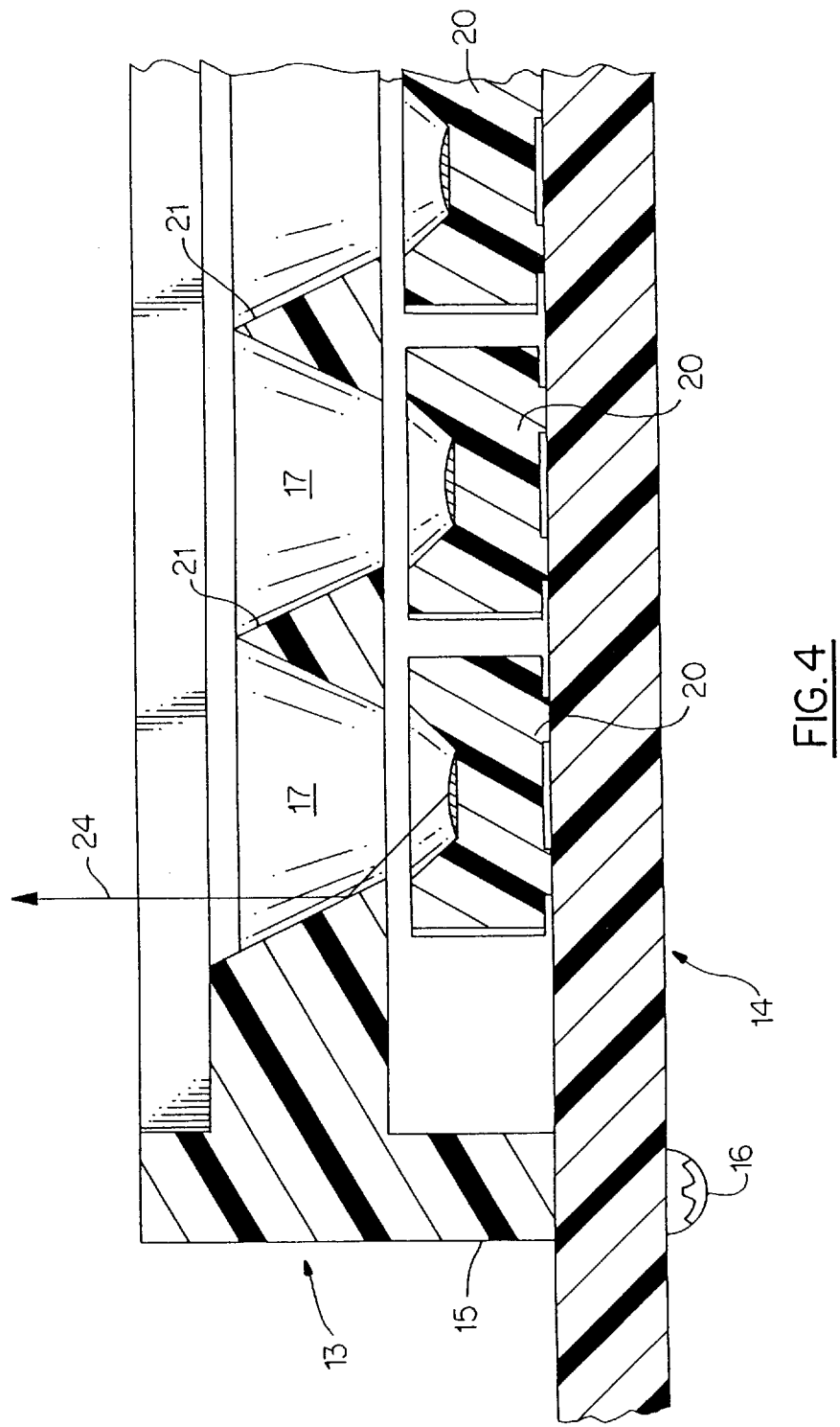
FIG. 4 is a partial enlarged view in section further showing the light redirecting panel and the LED board mounted thereto.

FIG. 4 shows in greater detail the positioning of the light emitting diodes with respect to the light redirecting panel. Each contoured opening has a conical shape that diverges from the back side of the panel toward the front or target side of the panel. The surfaces of the contoured opening are either formed of a highly reflective material or are coated with such a material so that light emitted by the LEDs striking the surfaces 21 will be reflected onto a target 41 (FIG. 3) located in front of the optical unit. The reflecting surfaces are specifically contoured to recover light rays that are about 40° to 60° off axis with regard to the axis of the LEDs and redirect the off axis light rays 24 (Fig.4) toward the target region.

Figure 6:
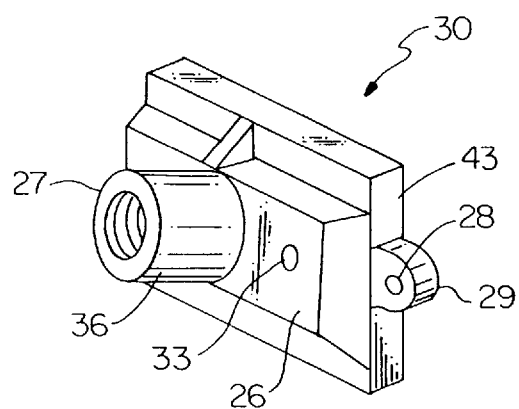
FIG. 6 is a perspective view of the imager housing utilized in the present invention.

Referring more specifically to FIGS. 3 and 6, an imager housing 30 is mounted on the LED board 14. The housing includes a rectangular shaped midsection 26 that is mounted against the back face of the board and held in place by means of screws 32—32 (FIG. 2) that are threaded into holes 33. A cylindrical lens barrel 36 depends upon the mid section of the housing and extends outwardly through axially aligned holes centrally located in the LED board and the light redirecting panel. Preferably, the distal end face of barrel 36 is located in the plane described by the front face of light redirecting panel, however, it can protrude slightly beyond the front face of the panel.

The rear section 30 of the imager housing, which also depends from the midsection, is expanded and contains a recessed chamber 35 that opens through the back wall of the housing. A solid state imager 43 is attached to the front face of an imager board 45. The imager board is secured to the back of the imager housing by means of screws 46—46, which are passed through holes 28 formed in tabs 29 projecting to either side of the imager housing (FIG. 6). A light and dust-tight seal 47 is positioned between the front face of the imager board and the back face of the imager housing which prevents ambient light and dust from passing through the back of the housing into the recessed chamber.

The term solid state imager, as herein used, refers to any solid state recording device containing a large number of light sensitive pixels that are arranged in horizontal rows and vertical columns capable of providing a two-dimensional readout. The imager may, for example, be either a CMOS device or, a CCD device, both of which are well known and widely used in the video recording art.

The interior surface of the lens barrel is provided with a female thread 37 that passes inwardly from the distal end 27 of the barrel substantially along its entire length. A lens holder, generally referenced 38, is threaded into the lens barrel and houses a lens system. The lens system can contain one or more lenses that serve to focus a clear image of the target 41 upon the photosensitive array portion of the imager 43. Fine focusing of the image can be obtained by moving the lens holder axially along the lens barrel by means of the screw threads. The distance (D) from the tip of the front lens 40 in the lens system and the plane of the imager is minimized to further compact the system. Lens systems having extremely short back focal length in a range of between 0.3 and 13 mm are now available that can be used in the present system without sacrificing image quality.

In the present embodiment of the invention the flat top LEDs 20 are shown contained within the region defined by the plane 63 in which the imager lies and a parallel plane 64 in which the distal tip of the front lens of the lens system lies. This, coupled with the use of a lens system having a short back focal length, allows the components of the optical unit to be packaged within a compact space. In the event the length of the LEDs exceed the distance (D) between the two parallel planes 63 and 64, the unit may be configured so that the distal tip of the front lens is coaligned so as to make the most effective use of the available space.

An aiming or spotting light 50 is mounted in the top section of the optical unit as illustrated in FIGS. 1–3. The aiming light is an LED which is larger than the LEDs 20 and extends back over the light redirecting panel and the LED board and is positioned in a recessed seat formed therein. The aiming light is tilted at a slight angle with regard to the axis of the lens system so that it will direct a beam of light upon a target within the viewing range of the optic. The aiming, which is performed by the operator, is used to align the reader's optic with a target prior to turning on the target illuminating LEDs 20. The distal tip of the aiming light, like those of the LEDs, is positioned at or slightly behind the plane 64 so that the entire aiming light lies within the region between the two planes 63 and 64 to again minimize the amount of space occupied by the optical unit. Although not shown, two or more aiming lights may be used to facilitate the operator in the alignment operation. In yet another implementation, the aiming light is one or more laser diodes.

As best illustrated in FIG. 1, the back side of the LED board contains circuitry 52 which, among other things powers and controls the operation of the LEDs. In addition, the back side of the imager board also contains circuitry 53 for generating image data signals of a target recorded from the solid state imager which can be used in decoding the target information. A mother board 54 is connected to the imager board by means of a series of pin connectors 57. (FIG. 1). The mother board 54, contains further circuitry 55 for storing the image data signals and decoding the signal information.

Figure 5:
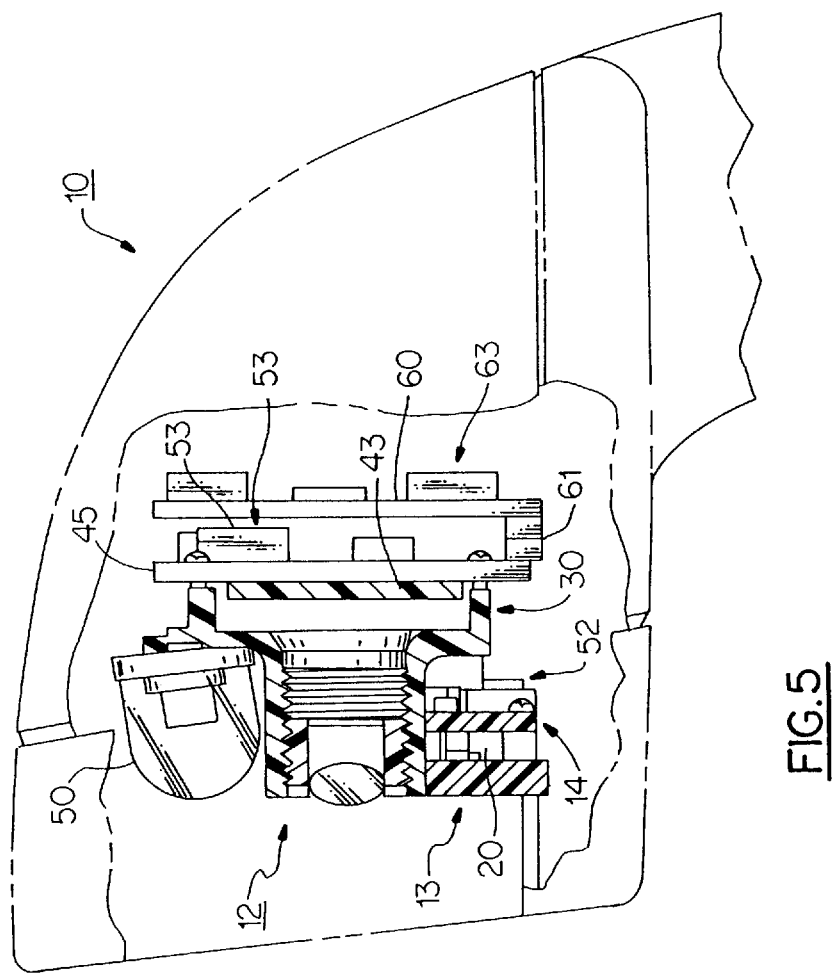
FIG. 5 is a side elevation in section similar to that of FIG. 3 illustrating a further embodiment of the optical assembly of the invention.

A further embodiment of the invention is shown in FIG. 5. In this embodiment, the horizontal mother board, as illustrated in FIG. 1, is replaced with at least one vertically disposed mother board 60 that is mounted in parallel alignment behind the imager board 45 by means of pin connectors 61. Here again, signal storing and decoding circuitry is mounted on one or both sides of the mother board. Alternatively, although not shown, additional mother boards may be similarly mounted in vertical alignment behind the board 60 to provide additional circuitry for servicing the low profile optical unit.

Figure 7:
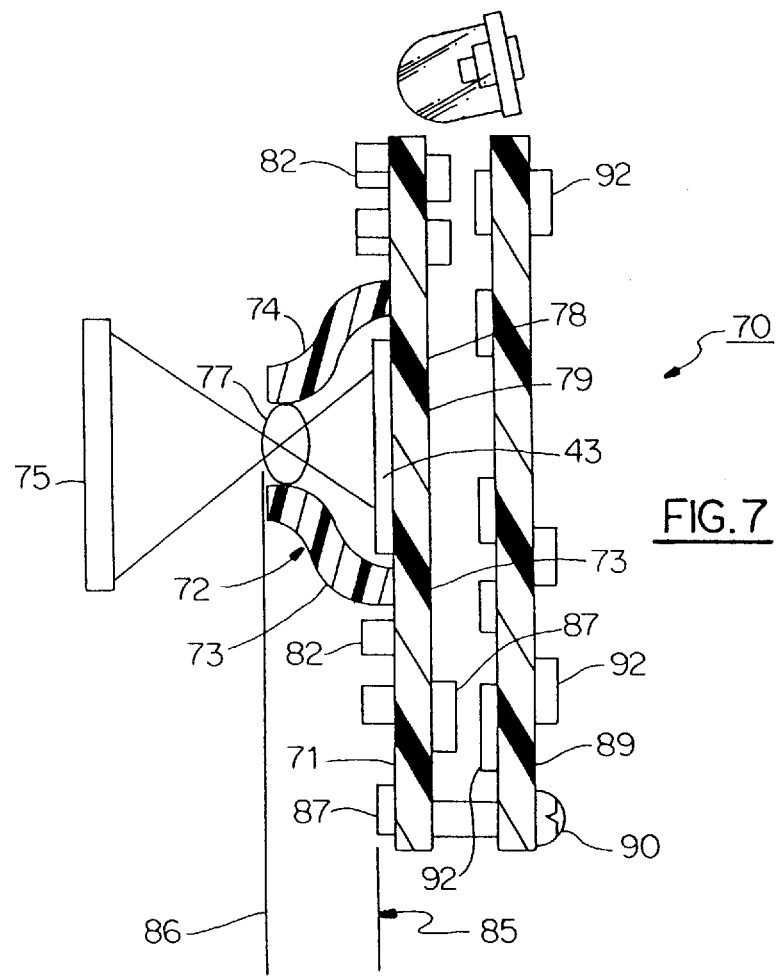
FIG. 7 is a side elevation in section showing a further embodiment of the optical assembly of the invention.

Turning now to FIG. 7, there is shown a further embodiment of the present invention. The optical unit, generally referenced 70, includes a LED board 71 on which is mounted an imager housing 72. The imager housing has a rectangular shaped rear section 73 that is centrally located on the LED board. The front section 74 of the housing extends outwardly from the front of the board toward the target 75. The front section of the housing tapers inwardly and terminates in a truncated cylinder in which is mounted a lens system 77. The lens system contains one or more lenses for focusing a target image upon a 2D imager 78 mounted in a recessed chamber 79 formed in the rear section of the housing. The lens system has a short back focal length so that the distance between the front lens of the lens system and the plane of the imager is minimized.

A series of light emitting diodes 82 are mounted upon the front face of the LED board. The diodes are arranged about the lens system to effectively illuminate a target within the viewing range of the optics. It should be understood by one skilled in the art that LEDs may be used in this embodiment that are equipped with an integrated lens. Here again, the diodes are mounted within the region defined by the plane of the imager 85 and a parallel plane 86 in which the tip of the front lens in the lens system lies. Electrical components 87 are also mounted on either side of the LED board for, among other things, powering and controlling the LEDs and generating image data signals. A mother board 89 is attached by screws 90 or the like behind the LED board and has electrical circuitry 92 thereon for processing image data signals from the LED board. An aiming light 91 is mounted above the boards and is set to deliver an aiming spot into the target region. The distal tip of the aiming lamp is located on or behind plane 86 to again minimize the utilization of space.

Figure 8:
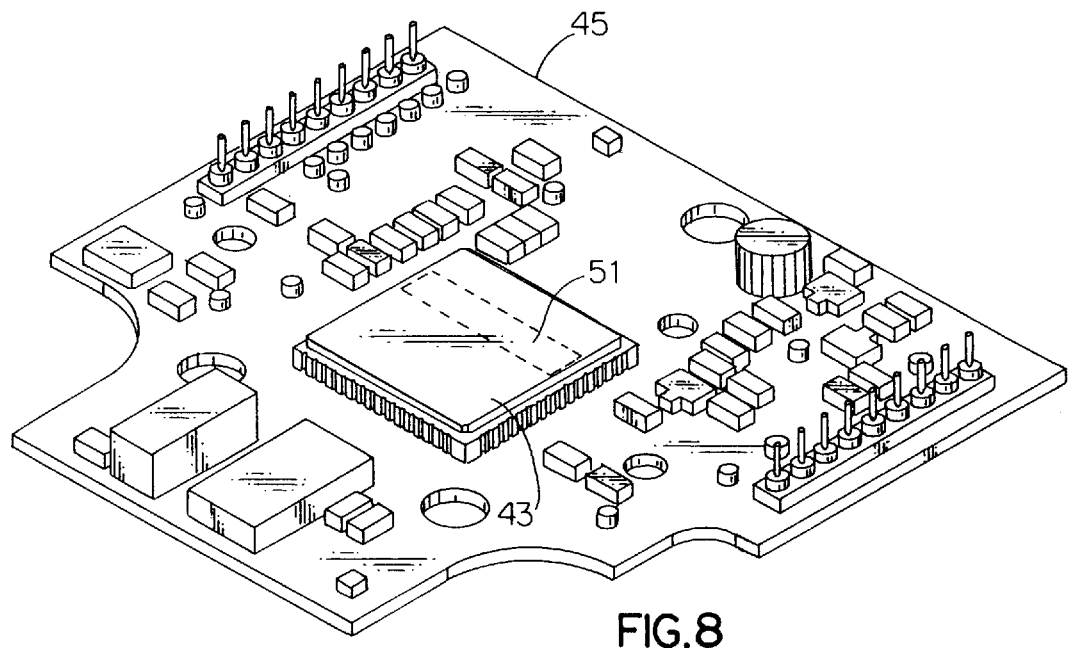
FIG. 8 is a perspective view of an exemplary imaging board including an image sensor having a conventional rectilinear orientation.
Figure 9:
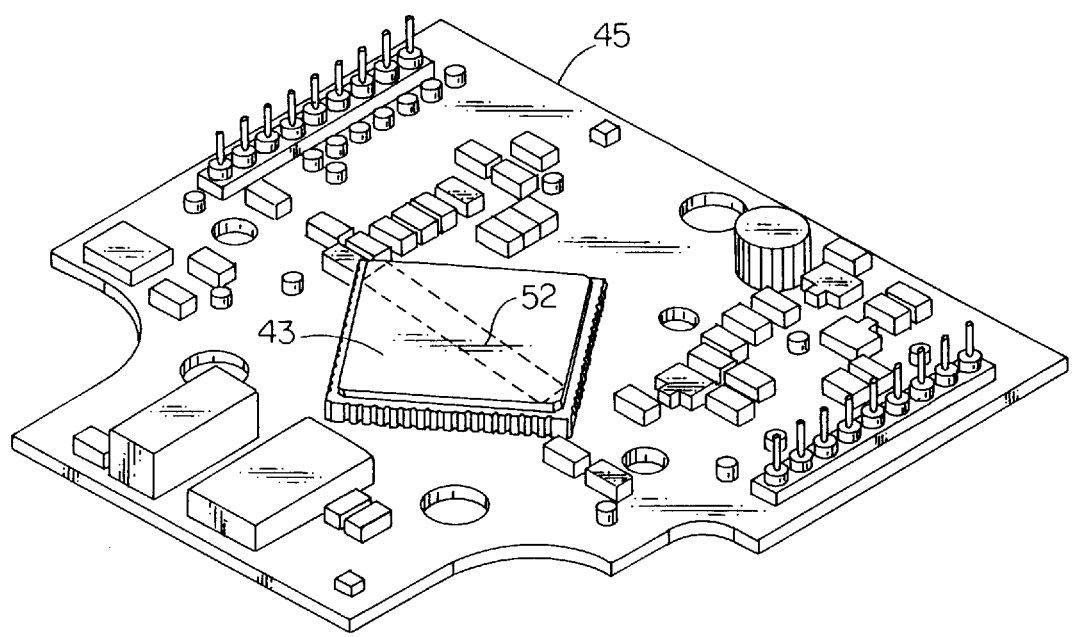
FIG. 9 is a perspective view of an exemplary imaging board including an image sensor having the diagonal orientation contemplated by the present invention.

As will be explained more fully later, the optical assembly of the invention may include an imager board or imaging assembly that has either an image sensor with a conventional rectilinear orientation, as shown in FIG. 8, or an image sensor with a diagonal orientation, as shown in FIG. 9. Conversely, an imager board having a diagonally oriented image sensor may be used either with an illuminating assembly of the type shown in FIGS. 1–7 or with a conventional illuminating assembly. Generally speaking, the present application is directed primarily to the diagonally oriented imager feature of the present invention without regard to the illuminating used therewith. The earlier cited application (of which the present application is a continuation-in-part), on the other hand, is directed primarily to the illuminating assembly of the present invention, without regard to the image sensor orientation used therewith.

The Imaging Assembly

Referring to FIG. 8, there is shown an enlarged perspective view of a conventional imager board of a type that is suitable for use as the rear portion of optical assembly 12. This view shows much of the foreground and background structures which were left out of previously discussed FIGS. 1, 3, 5 and 7 for the sake of clarity, or which did not show therein because of the effect of sectioning. In FIG. 8, imager 43 may comprise a 2D image sensor of the type sold under the designation VVL1060B+ by VLSI Vision, Ltd. The remainder of the circuit elements shown in FIG. 8 comprise the supporting elements, such as resistors, capacitors and diodes, that are associated with imager 43. Because the latter elements are conventional and have conventional functions, they will not be described in detail herein.

Image sensor 43 of FIG. 8 includes a plurality of photosensitive picture elements or pixels which includes 768 horizontal pixels and 574 effective vertical pixels making a total of approximately 440K pixels. These pixels are arranged in a generally rectangular array A of pixels a fragmentary plan view of which is shown in simplified form in FIG. 10. In the latter figure a representative row H1 of horizontal pixels includes a plurality of individual pixels H1A, H1B, etc., and a representative column V1 of vertical pixels includes a plurality of individual pixels V1A, V1B, etc. Data for a full frame of optical data imaged on array A is ordinarily read out of images 43 on a row-at-a-time basis via a horizontal register (not shown) at a suitable horizontal drive frequency such as 12.27 MHz. Because the operation of imager 43 in this manner is well known to those skilled in the art, it will not be described in detail herein.

When array 10 is mounted within optical assembly 12, the horizontal and vertical edges of array A are oriented so that they are either parallel or perpendicular to the front/rear and right/left edges of printed circuit board 45, as shown in FIG. 8. This orientation, which is referred to herein as "a rectilinear orientation", is the simplest and most cost effective orientation since it is easily handled by automatic parts insertion machines of commonly used types. As explained earlier, there is no reason to use a non-rectilinear orientation for readers that are used to read 2D bar code symbols. This is because all 2D matrix symbologies and decoding algorithms are based on the assumption that the relative orientation between a 2D symbol and the image sensor used to image the same is unknown or arbitrary.

The imaging of 2D bar code symbols with a 2D image sensor, such as imager 43, which has a roughly rectangular photosensitive array is a straightforward matter, at least in principle. This is, in part, because 2D matrix bar code symbols are also roughly square. This is also, in part, because 2D matrix bar code symbols have relatively large data elements and, consequently, do not require high resolution along either their horizontal or vertical axes. Accordingly, it is not critical where, or over how large a fraction of array A, a 2D symbol is imaged, provided that the resolution requirements of the symbol are met.

The imaging of 1D bar code symbols with a 2D image sensor, such as imager 43, is more problematic. This is, in part, because 1D bar code symbols must be imaged with a relatively high resolution along a direction perpendicular to the bars thereof, i.e., along the optimum or normal reading direction of the symbol. This is also, in part, because many 1D bar code symbols have lengths that are great in relation to their height and, consequently, are elongated rather than roughly square. Accordingly, it is important that the images of 1D bar code symbols that are formed on a 2D imager have the size and orientation that produces the best results.

Figure 11:
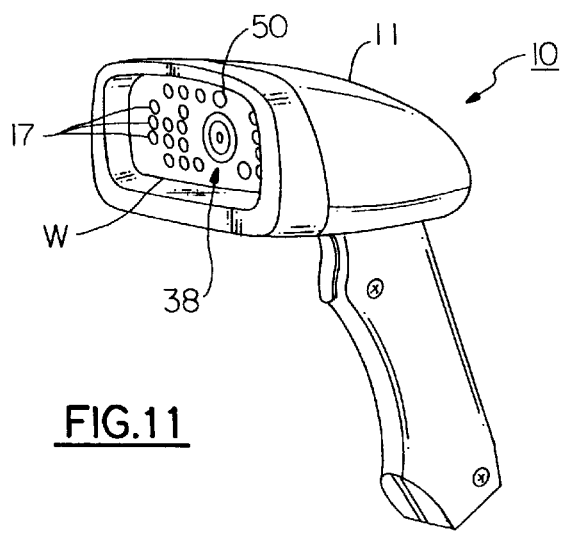
FIG. 11 is an oblique assembly view of a bar code reader constructed in accordance with the invention.

Prior to the present invention the above-described 1D orientation problem was dealt with by aligning the longer of the two dimensions of the photosensitive array of the imager parallel to the direction in which a bar code reader is normally held when 1D bar code symbols are being read, i.e., parallel to the long dimension of the read window W of the reader, as shown in FIG. 11. With this orientation, the image of the 1D bar code symbol on the imager was made as large as possible for a given size of array and a given reader-to-symbol distance, as best shown by dotted symbol image outline S1 of FIG. 8. As a result, the imager was made to provide the highest possible resolution.

In accordance with the present invention, the readability of 1D bar code symbols, particularly relatively long 1D bar code symbols, is improved by mounting the imager with a position and orientation such that the image of the 1D bar code symbol falls on the diagonal of the photosensitive array when the reader is held in the reading position normally used for 1D bar code symbols. More particularly, as best shown in FIG. 9, the imager 43 is located so that, when the long dimension of reading window W is aligned in parallel with the optimum read direction of a 1D symbol, the image of that symbol will have the position and orientation shown by dotted symbol image outline S2 in FIG. 9.

Because of this position and orientation, the symbol image S2 produced by the reader of the invention will be larger than the symbol image S1 produced by prior art readers by the ratio of the length of the diagonal of the array to the longer of the two sides of that array. This ratio will be greatest in a square array, in which it will have a value of $\sqrt{2}$ or 1.414. It will be significant, however, even in imagers having arrays that are only roughly square. As a result, the image sensor is made to operate with an increased resolution for a given set of imaging lenses and a given reader-to-target distance.

Figure 10:
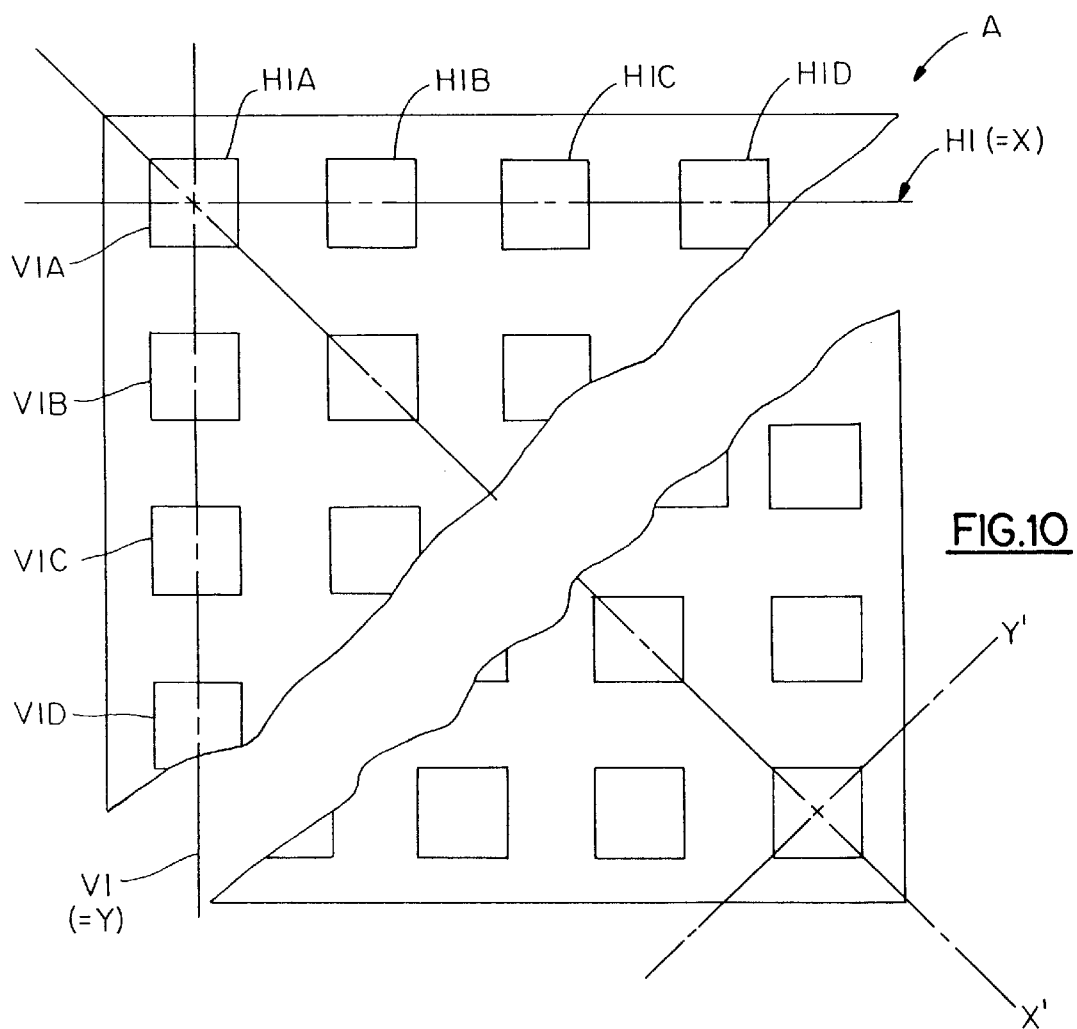
FIG. 10 is an enlarged fragmentary plan view of the photosensitive array of an exemplary type of 2D image sensor.

The advantages of the present invention will be apparent from the following specific example. If imager 43 is a VVL 1060B+, manufactured by VLSI Vision, Ltd., it will have a photosensitive array with 768 pixels along its horizontal (or X) axis and 574 pixels along its vertical (or Y) axis, each pixel having a dimensions of 10.5 by 10.5 microns. By orienting the imager at an angle of 36.7° with respect to the long dimension of read window W, however, the imager will function as if it had 958 pixels along a rotated horizontal (or X') axis and 641 pixels along a rotated vertical (or Y') axis, as shown in FIG. 10. In addition, each of these "new" pixels will have effective X' and Y' dimensions of 14.8 by 14.8 microns In view of the foregoing, it will be seen that a 1D symbol whose image spans the full width of the array will be represented by more pixels if it spans the full width of array X'—Y' than if it spans the full width of array X–Y. Equivalently, it will be seen that, for a given set of optical lenses and reader-to-target distance, the reader of the invention can fully image on array X'–Y' a bar code symbol that is substantially longer than a reader that forms its image on array X–Y. In either case the end result is a net improvement in the ability of the reader to read and decode 1D bar code symbols.

In order to realize the full benefit of the new imager orientation used by the optical imaging assembly of the invention, it is desirable to modify the decoding programs used in the 1 D portion of any autodiscrimination algorithms that are used therewith. This is because decoding programs often make use of a succession of angularly spaced virtual or exploratory scan lines in attempts to decode 1D bar code symbols. Such successions of scan lines usually begin with a virtual scan line that is assumed to correspond to a horizontal row of the imager data. This beginning direction amounts to an assumption that the preferred reading direction of the symbol is parallel to the horizontal rows of the imager array. Alternatively, the image data may be rotated in memory until the data can be decoded with respect to a fixed scan line.

In one embodiment of the present invention, it is assumed that the preferred reading direction of the symbol to be decoded lies along one of the diagonals X' and Y' of the imager array, rather than along one of the rectilinear X and Y axes thereof. This is a reasonable assumption because more often than not, a user will hold the reader with an orientation such that the long axis of the bar code symbol is parallel to the long axis of the reader window. When, as often will be the case, this assumption is correct, the reader may well be able to decode the symbol on its first attempt, without first having tried and failed, to decode the symbol with a horizontal virtual scan line. Even if this attempt fails, however, these steps may be immediately followed by generation of the above-described virtual scan lines in the usual way.

Alternatively, the laying down of the exploratory scan lines may be performed in the usual way, beginning with scan lines parallel to one of the rectilinear axes X and Y of the array. The disadvantage of this approach is that numerous scan lines will be attempted before a usually diagonal scan line is developed by a process of trial and error. Accordingly, this embodiment is not the preferred embodiment of the invention.

It will be understood that both of the above-described embodiments, and their equivalents, are within the contemplation of the present invention. Because the generation and use of virtual scan lines that have any desired direction with respect to a stored set of image data is known, this generation and use will not be described in further detail herein.

While this invention has been explained with reference to the structure disclosed herein, it is not confined to the details set forth and this invention is intended to cover any modifications and changes as may come within the scope of the following claims.

What is claimed is:

1. In a reading apparatus of the type including an image sensor having a generally planar rectangular array of photosensitive elements, an imaging optics assembly for imaging a bar code symbol on said array, and a mounting member for mounting said image sensor so that the plane of said array is generally parallel to and approximately in the focal plane of said imaging optics assembly, the improvement comprising:

mounting said image sensor on said mounting member so that, when the reading apparatus has its normal orientation with respect to the reading axis of a 1D bar code symbol, a diagonal of said array is approximately aligned with said reading axis.

2. The reading apparatus of claim 1 further including a plurality of light sources, arranged in a generally planar configuration around said imaging optics assembly, for illuminating said bar code symbol.

3. The reading apparatus of claim 2 in which said plurality of light sources are mounted on a first circuit board that lies in a plane generally parallel to the plane of said planar array, and in which said mounting member comprises a second circuit board that lies in a plane generally parallel to said first circuit board.

4. The reading apparatus of claim 3 further including a generally planar light director member having a plurality of reflective surfaces for directing light from respective ones of said light sources in the direction of said bar code symbol, and means for mounting said light director member in an orientation generally parallel to said first circuit board.

5. The reading apparatus of claim 3 in which said first circuit board defines an opening through which said imaging optics assembly passes.

6. The reading apparatus of claim 5 further including a mother board, in which said first and second circuit boards are both secured to said mother board.

7. The reading apparatus of claim 6 further including a read window, in which the focal length of said imaging optics assembly is sufficiently short that said light sources, said imaging optics assembly and said image sensor are all located in proximity to said read window.

8. The reading apparatus of claim 1 further including a hand held housing having a front portion and a rear portion, in which said image sensor, said imaging optics assembly and said mounting member occupy only the front portion of said housing.

9. The reading apparatus of claim 1 further including illuminating means, disposed in proximity to said imaging optics assembly, for illuminating said bar code symbol.

10. The reading apparatus of claim 9 in which said illuminating means includes a generally planar array of light sources, and a generally planar light director member having a plurality of reflective surfaces for directing light from respective ones of said light sources in the direction of said bar code symbol.

11. In a reading apparatus for bar code symbols, in combination:

an image sensor including a two-dimensional array of photosensitive elements; focusing means for focusing an image of a bar code symbol on said array; illuminating means for illuminating said bar code symbol;

means for supporting said illuminating means in illuminating relationship to said bar code symbol, and for supporting said focusing means in imaging relationship to said array;

said image sensor being so oriented with respect to said supporting means that, when the reading apparatus is held in its normal reading orientation with respect to a 1D bar code symbol, an image of said bar code symbol is formed approximately across a diagonal of said array.

12. The reading apparatus of claim 11 further including an optical housing enclosing said focusing means, in which said supporting means comprise first and second approximately parallel circuit boards that are secured to said optical housing.

13. The reading apparatus of claim 12 further including a mother board including circuitry for processing signals generated by said image sensor, in which said supporting means is mounted on said mother board.

14. The reading apparatus of claim 13 in which said supporting means is so mounted on said mother board that, when the reading apparatus has said normal reading orientation, the planes of said first and second circuit boards are approximately parallel to the plane of said symbol, whereby said illuminating means, said focusing means, and said image sensor occupy a relatively small fraction of the interior of said housing.

15. The reading apparatus of claim 12 in which said illuminating means includes a plurality of light sources, and a light director member secured to said optical housing, in proximity to said array of light sources for reflectively directing light from said light sources toward said symbol.

16. The reading apparatus of claim 15 in which said light director member is generally planar, the plane of said light director member being approximately parallel to the planes of said first and second circuit boards.

17. The reading apparatus of claim 11 further including a hand held housing having a front portion and a rear portion, in which said focusing means, said illuminating means and said image sensor form parts of a low profile optical imaging assembly which occupies only the front portion of said hand held housing.

18. The reading apparatus of claim 17 in which said reading apparatus includes a transparent window mounted in the front portion of said hand held housing, and in which said low profile optical imaging assembly includes a plurality of generally planar members which are stacked behind one another in proximity to said window.

19. In an optical unit for use in a symbol reader, in combination:

a light redirecting panel having a plurality of contoured openings passing therethrough between a front face and a back face of said panel said contoured openings defining light reflecting surfaces for directing light incident thereupon onto a target symbol in front of said panel;

an LED board mounted in parallel alignment with said panel behind the back face of said panel, said LED board having a plurality of low profile light emitting diodes mounted thereon for illuminating said target symbol, said light emitting diodes being positioned behind respective openings in said panel;

an imager housing secured to the LED board, said housing defining a recessed chamber that opens through the back of said housing and a hollow lens barrel extending forward of said recessed chamber that passes through coaxially aligned holes in said panel and said LED board;

2D image sensor including a rectangular array of photosensitive elements;

an imaging optics assembly mounted within said lens barrel for forming an image of said symbol on said array;

an imager board secured to said housing for supporting said image sensor in proximity to said imaging optics assembly;

wherein said image sensor is so oriented on said imager board that, when the optical unit is held approximately in its optimum orientation with respect to a 1D symbol, said image extends approximately across a diagonal of said array.

20. The optical unit of claim 19 in which said image sensor projects into said recessed chamber.

21. The optical unit of claim 19 in which said panel, said LED board, and said imager board are disposed one behind another to form a stack of generally planar elements.

22. The optical unit of claim 21 further including a housing, shaped to be held in a human hand, for enclosing and supporting said optical unit, said housing including a front portion and a rear portion.

23. The optical unit of claim 22 further including a read window mounted in the front portion of said housing, in which said stack is located in proximity to said read window.

24. The optical unit of claim 19 further including a housing, shaped to be held in a human hand, for enclosing and supporting said optical unit, said housing including a front portion and a rear portion.

25. In an optical unit for use in reading bar code symbols, in combination:

a first circuit board having a plurality of light sources mounted thereon for directing light onto a target symbol situated in front of said first board;

an imager housing secured to said first circuit board, said housing defining a hollow lens barrel extending toward said symbol;

an imager including a rectangular array of photosensitive elements;

a second circuit board secured to one of said imager housing and first circuit board for supporting said imager in proximity to said housing;

a lens system mounted in said lens barrel having at least one lens element for focusing an image of said symbol upon said array;

wherein said imager is so mounted with respect to said lens system that, when the unit is held in its normal position with respect to a 1D bar code symbol, said image extends substantially across a diagonal of said rectangular array.

26. The optical unit of claim 25 in which said imager housing defines an imager chamber for receiving said imager.

27. The optical unit of claim 25 in which said first and second circuit boards are disposed in parallel with one another.

28. The optical unit of claim 27 further including a housing, shaped to be held in a human hand, for enclosing and supporting said optical unit.

29. The optical unit of claim 28 further including a read window, mounted in the front portion of said housing, in which said circuit boards are positioned in proximity to said read window.

30. The optical unit of claim 25 further including a housing, shaped to be held in a human hand, for enclosing and supporting said optical unit.

* * * * *